(12) United States Patent
Kameda et al.

(10) Patent No.: US 7,947,141 B2
(45) Date of Patent: May 24, 2011

(54) METHOD FOR MANUFACTURING PNEUMATIC TIRE

(75) Inventors: Norifumi Kameda, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 502 days.

(21) Appl. No.: 12/204,609

(22) Filed: Sep. 4, 2008

(65) Prior Publication Data

US 2009/0065123 A1    Mar. 12, 2009

(30) Foreign Application Priority Data

Sep. 12, 2007    (JP) ................ 2007-236218

(51) Int. Cl.
*B29D 30/20*    (2006.01)

(52) U.S. Cl. ........ 156/126; 156/123; 156/133; 156/201; 156/267; 152/510

(58) Field of Classification Search ........... 156/118, 156/121, 123, 126, 130.3, 130.7, 201, 267, 156/406.4; 152/510
See application file for complete search history.

(56) References Cited

U.S. PATENT DOCUMENTS

2006/0243371 A1 * 11/2006 Kanenari ............ 156/123

FOREIGN PATENT DOCUMENTS

| JP | A 10-29248 | 2/1998 |
|---|---|---|
| JP | A 2001-260137 | 9/2001 |
| WO | WO-2006/075550 A1 * | 7/2006 |

OTHER PUBLICATIONS

Machine translation of JP2001-260137A, patent document published Sep. 25, 2001.*

* cited by examiner

*Primary Examiner* — Geoffrey L Knable
(74) *Attorney, Agent, or Firm* — Greer, Burns & Crain, Ltd

(57) ABSTRACT

Provided is a method of manufacturing a pneumatic tire, which is capable of reducing tire failure without leading to reduction in productivity, the method including: folding a cylindrical film made of thermoplastic resin or thermoplastic elastomer composition into a sheet shape; stacking rubber layers on both surfaces of the folded film in a manner that the rubber layers protrude from both edge portions of the film; forming a laminate by cutting protruding parts of the rubber layers into rubber protruding portions each having an amount of protrusion (h) in a range from 3 mm to 20 mm; expanding the laminate into a cylindrical shape and fitting the laminate onto a tire making drum; pressing down each rubber protruding portion toward the surface of the drum by use of a pressure roller; pasting other components of a tire onto the laminate to form an uncured tire; and curing the uncured tire.

2 Claims, 4 Drawing Sheets

3 A

3 B

3 C

4 A

4 B

METHOD FOR MANUFACTURING PNEUMATIC TIRE

BACKGROUND OF THE INVENTION

1. Field of the Invention

The present invention relates to a method for manufacturing a pneumatic tire, and more specifically, to a method for manufacturing a pneumatic tire, the method being capable of reducing tire failure that would occur when a film made of a thermoplastic resin or a thermoplastic elastomer composition is used as an air permeation preventive layer.

2. Description of the Related Art

It has been recently proposed that a film made of a thermoplastic resin or a thermoplastic elastomer composition is disposed as an air permeation preventive layer for a pneumatic tire instead of a rubber layer made of an isobutylene-isoprene rubber, the thermoplastic elastomer composition obtained by blending an elastomer with a thermoplastic resin.

The following method for forming such air permeation preventive layer has been known. In this method, a thermoplastic resin or a thermoplastic elastomer composition is extruded and molded into a cylindrical film by inflation molding or the like. The cylindrical film thus molded is folded into a sheet shape. Then, rubber layers serving as a tie rubber are stacked respectively onto both sides of the folded film, so that a laminate is formed. Thereafter, the laminate is expanded into a cylindrical shape, and fitted onto a tire making drum, so that an uncured tire is formed. Such method is disclosed, for example, in Japanese patent application Kokai publication Nos. Hei 10-29248 and 2001-260137.

However, the stacking of rubber layers onto both surfaces of a film folded into the sheet shape has the following problems. If the rubber layers are not stacked in a manner that the rubber layers protrude from both edge portions of the film in the width direction, a portion where the edge portions of the rubber layers are spliced (hereinafter, this portion is referred to as a spliced portion) may be opened when the laminate is fitted onto a tire making drum, thus causing tire failure. However, while such too small amount of protrusion of the rubber layers may cause the spliced portion to open, too large amount of protrusion, by contrast, may cause another problem. Specifically, too large amount of protrusion causes the spliced portion to protrude to a large extent in the radius direction of the tire making drum when the laminate is fitted onto the drum. When other components of a tire are pasted on such spliced portion, an air pocket or a wrinkle is likely to be generated around the spliced portion, thus also causing tire failure. However, consider the process of stacking rubber layers each formed to have a certain width respectively on both surfaces of a film folded into the sheet shape. In this process, it is very difficult, when stacking the rubber layers, to strictly adjust the amount of protrusion of rubber from each edge portion of the film in the width direction. Such difficulty leads to reduction in productivity of tires.

SUMMARY OF THE INVENTION

It is an object of the present invention to provide a method for manufacturing a pneumatic tire, the method being capable of reducing, without leading to reduction in productivity, tire failure which would occur when a film made of a thermoplastic resin or a thermoplastic elastomer composition made of a thermoplastic resin and an elastomer is used as an air permeation preventive layer.

A method for manufacturing a pneumatic tire for achieving the above-described object includes the steps of: molding a cylindrical film of any one of a thermoplastic resin and a thermoplastic elastomer composition in which an elastomer is blended in a thermoplastic resin; folding the cylindrical film into a sheet shape; forming a laminate by stacking rubber layers respectively on both surfaces of the folded film; expanding the laminate into a cylindrical shape and fitting the expanded laminate onto a tire making drum; pasting other components of a tire, including a carcass layer, onto an outer side of the laminate, so as to form an uncured tire having the film as an air permeation preventive layer; and curing the uncured tire. The method provides the following characteristics. In the step of forming the laminate, the rubber layers are stacked respectively on both surfaces of the film, which is folded into the sheet shape, in a manner that the rubber layers protrude from both edge portions of the film in a width direction. Then, the laminate is formed by cutting protruding parts of the rubber layers respectively into rubber protruding portions each having an amount of protrusion (h) in a range from 3 mm to 20 mm from the edge portion of the film in the width direction. In addition, after the laminate is expanded into the cylindrical shape and fitted onto the tire making drum, each of the rubber protruding portions is pressed down toward the surface of the tire making drum by use of any one of a pressure roller and a pressure pin, so as to be pressure-bonded to the rubber layer of the laminate.

A radius (r) of the one of the pressure roller and the pressure pin may be not less than 1 mm and not more than 7.5 times the amount of protrusion (h) of the rubber protruding portions.

In the method for manufacturing a pneumatic tire according to the present invention, the rubber layers are stacked respectively on both surfaces of the film, which is folded into the sheet shape, in a manner that the rubber layers protrude from both edge portions of the film in a width direction. Thereafter, the laminate is formed in a way that protruding parts of the rubber layers are cut respectively into rubber protruding portions each having an amount of protrusion (h) in a range from 3 mm to 20 mm, from the edge portion of the film in the width direction. This allows the stacking operation of the rubber layers before the cutting operation to be randomly carried out without the amount of protrusion (h) being managed at all. Accordingly, the forming operation is facilitated, and the productivity is increased. Moreover, in a state where the film folded into the sheet shape is expanded into a cylindrical shape and fitted onto the tire making drum, each of the rubber protruding portions protruding outward in the radial direction is adjusted to fall within a range from 3 mm to 20 mm. In this state, the rubber protruding portion is pressed down toward the surface of the making drum by use of the pressure roller, so as to be pressure-bonded to the rubber layer of the laminate. This configuration makes it possible to prevent the spliced portions of the rubber layers from being opened, and also to prevent an air pocket or a wrinkle from being generated.

BRIEF DESCRIPTION OF THE DRAWINGS

FIG. 3A is the front view showing a stacking process. FIG. 3B is the front view showing a cutting process, and FIG. 3C is the front view showing a state after the cutting process.

FIG. 4A is the side view before a pressure roller is used, while FIG. 4B is the side view after the pressure roller is used.

DETAILED DESCRIPTION OF THE PREFERRED EMBODIMENT

Figure 1:
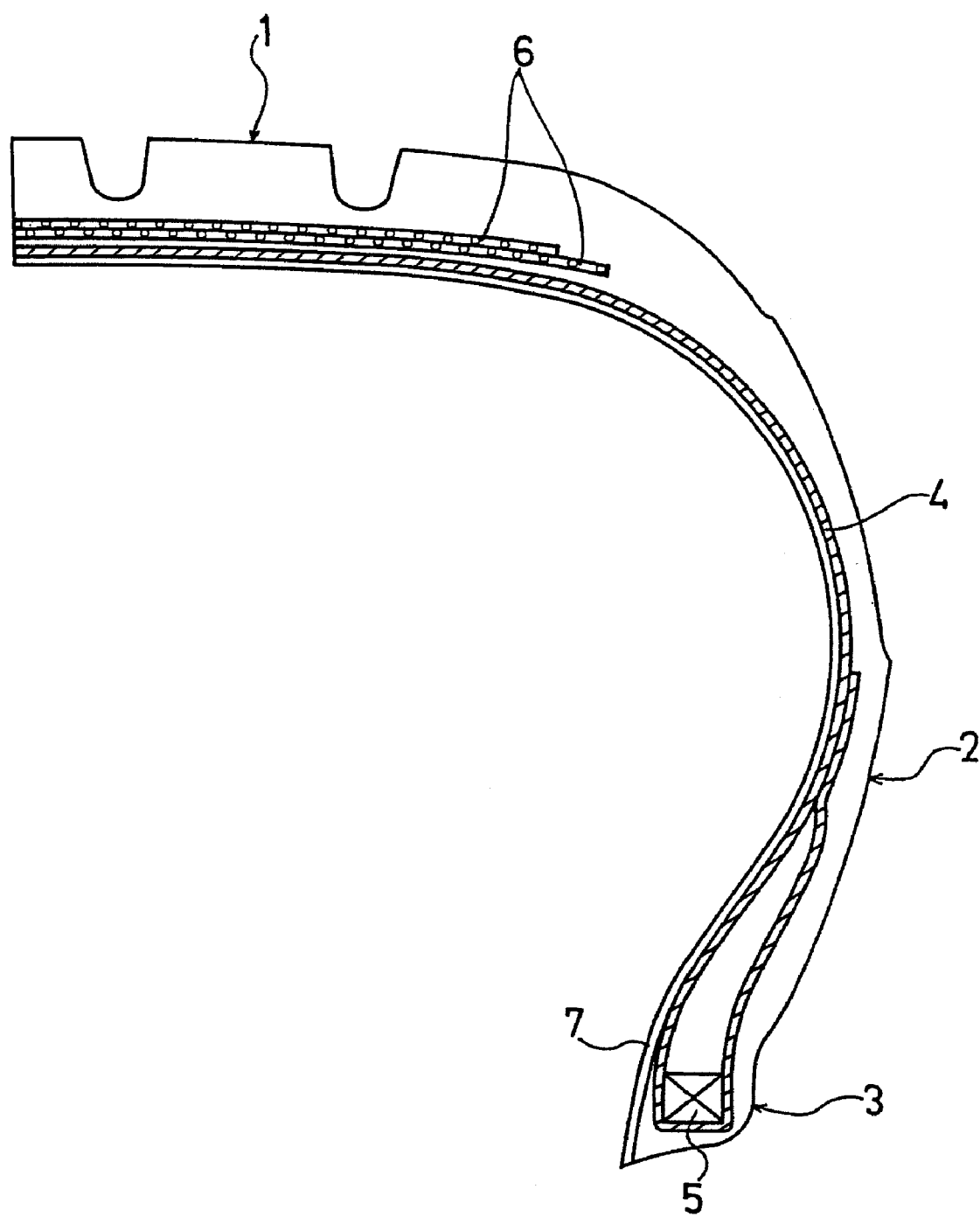
FIG. 1 is a meridian half sectional view showing an example of an embodiment of a pneumatic tire manufactured according to the present invention.

FIG. 1 shows an embodiment of a pneumatic tire formed by a method for manufacturing a pneumatic tire according to the present invention.

In FIG. 1, reference numeral 1 denotes a tread portion, 2 denotes sidewall portions, and 3 denotes bead portions. A carcass layer (4) is laid between the pair of right and left bead portions (3, 3). Each of end portions of the carcass layer (4) is folded around a bead core (5) from the inside to the outside of the tire. Multiple belt layers (6) are buried on the outer circumferential side of the carcass layer (4) in the tread portion (1). In the belt layers (6), reinforcing cords are inclined to a tire circumferential direction, and also, arranged in a manner that the reinforcing cords in each belt layer (6) intersect those in the other belt layers (6).

In the pneumatic tire, an air permeation preventive layer (7) is disposed on a side, facing the cavity of the tire, of the carcass layer (4). The air permeation preventive layer (7) is formed of a laminate of: a film made of a thermoplastic resin or a thermoplastic elastomer composition; and rubber layers serving as a tie rubber for the carcass layer (4).

Next, the method for manufacturing a pneumatic tire employing the above-described laminate according to the present invention will be described with reference to FIGS. 2 to 4.

The film made of the thermoplastic resin or the thermoplastic elastomer composition to form the air permeation preventive layer (7) is molded into a cylindrical shape, and is obtained by, for example, being extrusion-molded by inflation molding. The cylindrical film is folded into the sheet shape in advance before being fitted onto a making drum for making an uncured tire. Then, as shown in FIG. 2, the folded sheet-shaped film (11) and rubber layers (12, 13) are laminated in such a way that the rubber layers (12, 13) serving as the tie rubber are pasted respectively onto both surfaces of the folded film (11). Here, the rubber layers (12, 13) are formed in advance to have a certain width.

Figure 2:
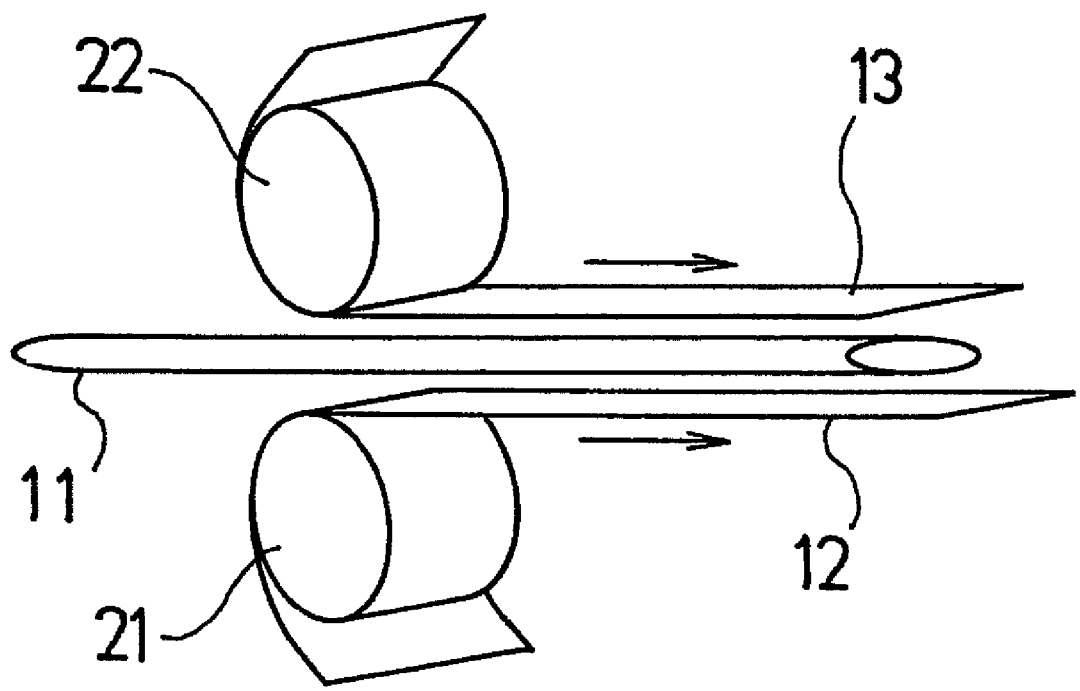
FIG. 2 is a perspective view showing a method for manufacturing a laminate made of a film and rubber layers, the laminate employed in the present invention.
Figure 3:
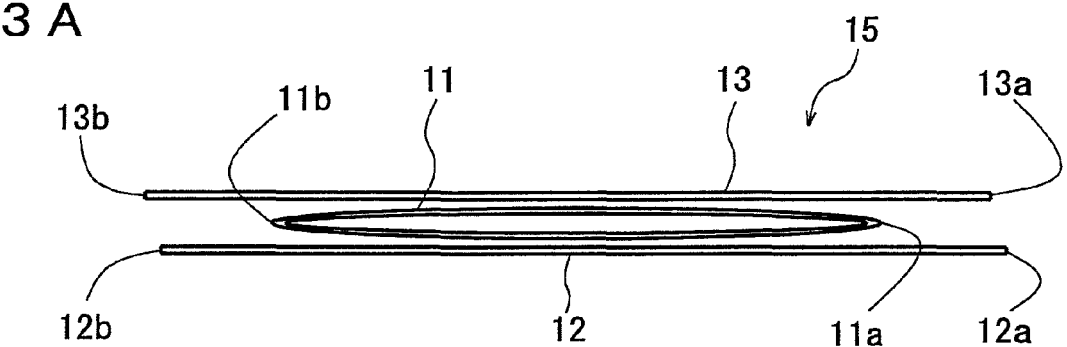
FIGS. 3A to 3C are front views schematically showing processes for forming the laminate employed in the present invention.
Figure 3:
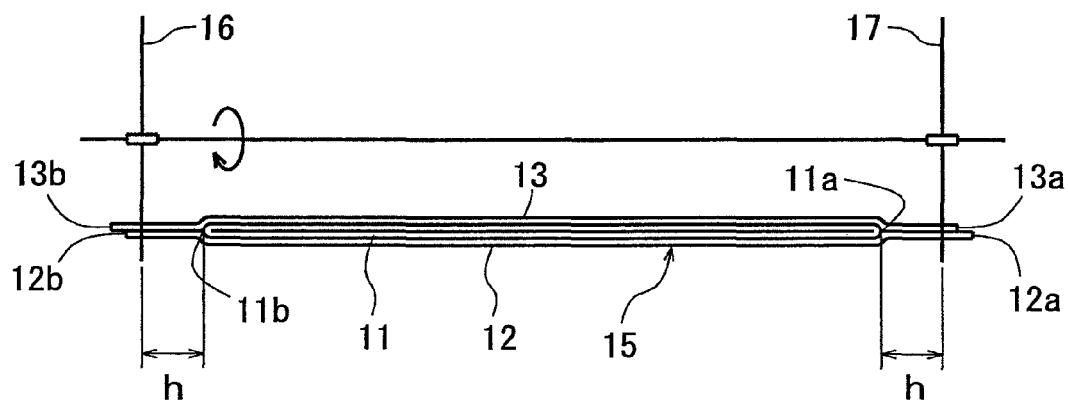
Figure 3:
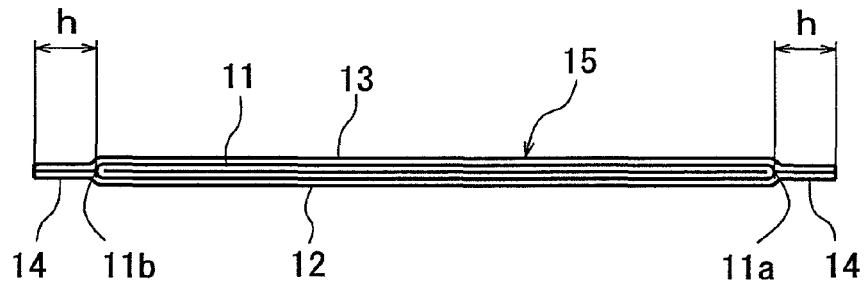

As shown in FIG. 2, the cylindrical film (11) is continuously fed between a pair of pressure rollers (21, 22), or a pair of pinch rolls, thereby being folded into a sheet shape. Concurrently, the rubber layers (12, 13) each having the certain width are stacked onto both surfaces of the folded film (11) respectively by the pressure rollers (21, 22). In this way, a laminate (15) of the film (11) and the rubber layers (12, 13) is obtained as shown in FIG. 3A. In the present invention, it is required that an amount of protrusion of each rubber layer (12, 13) protruding from each of the two edges of the film (11) be set in a range from 3 mm to 20 mm. This stacking process does not require the adjustment of the amount of protrusion, and the rubber layers (12, 13) may be stacked so as to protrude by an amount somewhat larger than the required amount. Although illustrated in FIGS. 2 and 3A as if being separated from one another for facilitating the understanding, the film (11) and the rubber layers (12, 13) actually form an integrally-laminated sheet member.

As shown in FIG. 3A, in the laminate (15), the rubber layers (12, 13) are pasted respectively on the upper and lower surfaces of the film (11) folded into the sheet shape. Moreover, two edge portions (12a and 13a, 12b and 13b) of each of these rubber layers (12, 13) in the width direction protrude outward respectively from the edge portions (11a, 11b) of the film (11) in the width direction. The amount of protrusion may be set arbitrarily, and the edge portion (12a) and the edge portion (13a), or the edge portion (12b) and the edge portion (13b) are not necessarily required to be located at the same position.

Subsequently, the laminate (15) is sent to a cutting process. As shown in FIG. 3B, protruding parts of the rubber layers (12, 13) protruding from both edge portions of the film (11) are cut by using cutters (16, 17), so that rubber protruding portions (14) are formed. An amount of protrusion (h) of each rubber protruding portion (14) from the edge portion of the film (11) in the width direction is adjusted, by the cutting, to fall within a range from 3 mm to 20 mm, and preferably in a range from 5 mm to 10 mm. In the above-described manner, the laminate (15) having the rubber layers (12, 13) protruding by any dimension is randomly formed, and thereafter, protruding parts of the rubber layers (12, 13) are partially cut to be adjusted. This makes it possible to easily form the rubber protruding portions (14) each having the amount of protrusion (h) precisely set in a range from 3 mm to 20 mm as shown in FIG. 3C.

Alternatively, the laminate (15) may be formed by stacking, on the film (11), the rubber layers (12, 13) that have been cut before hand each to have a predetermined width. In this case, it is not necessary that the positions of the edge portions, on each side in the width direction, of the respective rubber layers (12, 13) coincide with each other. If the width of parts, stacked on each other, of the rubber layers (12, 13) is in a range from 3 mm to 20 mm, the cutting process may be omitted.

Figure 4:
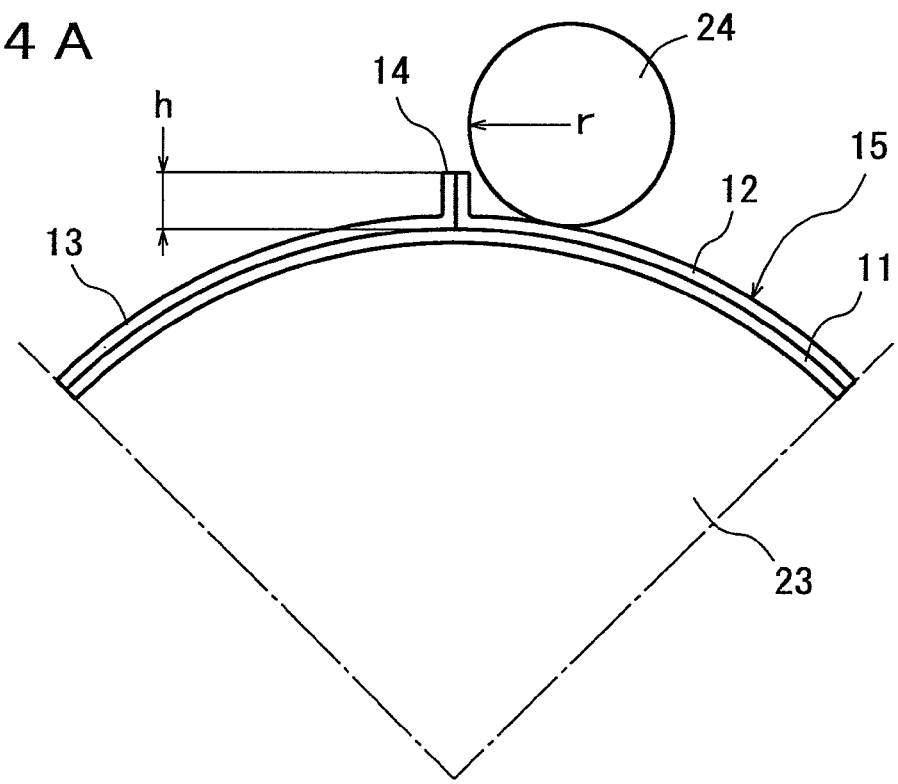
FIGS. 4A and 4B are side views showing an example of a state where the laminate of the film and the rubber layers is fitted onto a tire making drum, the laminate employed in the present invention.
Figure 4:
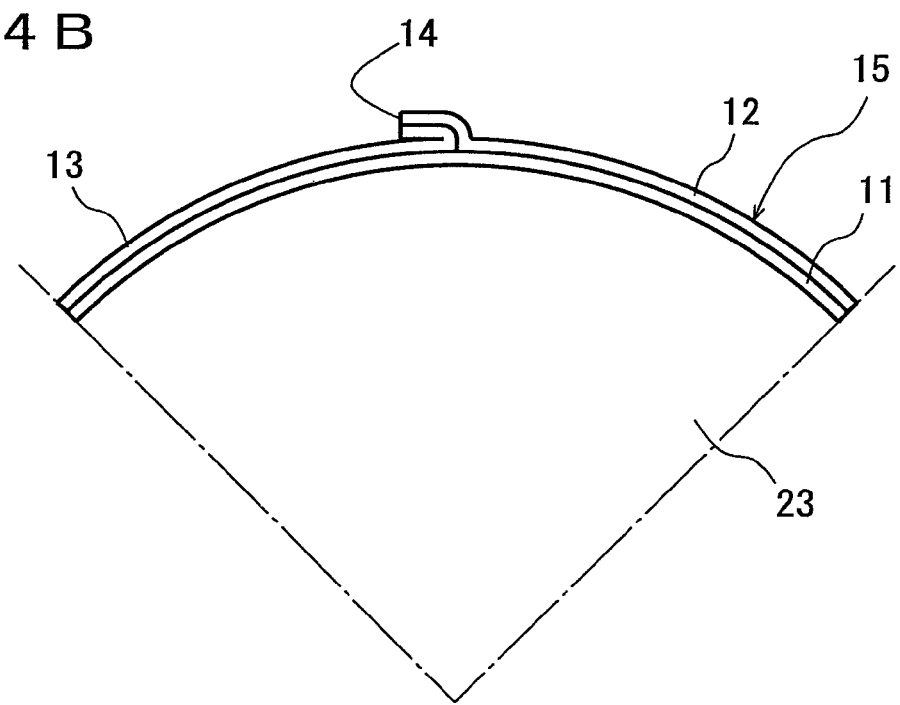

Next, as shown in FIG. 4, the laminate (15) having the rubber protruding portions (14) each having the precisely set amount of protrusion (h) is fitted onto the tire making drum (23) in a way that the film folded into the sheet shape is expanded into a cylindrical shape.

FIG. 4A shows a state where the laminate (15) of the film (11) and the rubber layers (12, 13) is fitted onto a tire making drum (23). In this state, each of the rubber protruding portions (14) protrudes outward in a radial direction of the tire making drum (23). The rubber protruding portion (14) is pressed down onto the tire making drum (23) by a pressure roller (24) caused to roll on the surface of the tire making drum (23). Thus, as shown in FIG. 4B, the rubber protruding portion (14) is pressure-bonded to, and integrated with, the rubber layer (13) in the surface of the laminate (15). FIGS. 4A and 4B show an example using the pressure roller (24) having a radius (r) not less than the amount of protrusion (h) of the rubber protruding portion (14). Instead of the pressure roller (24), a pressure pin having a radius (r) less than the amount of protrusion (h) may be used. Since the rubber protruding portion (14) is pressure-bonded to the laminate (15) as above, no air pocket is formed between the rubber protruding portion (14) and the laminate (15) when a carcass layer is laminated on the rubber protruding portion (14) and the laminate (15). Moreover, no wrinkle is formed in the carcass layer.

The forming process after the winding of the carcass layer may be carried out in accordance with a publicly-known method, involving fitting beads and stacking a side rubber, belt layers, and a tread rubber.

As described above, the amount of protrusion (h) of the rubber protruding portion (14) has to be in a range from 3 mm to 20 mm. If the amount of protrusion (h) is less than 3 mm, the spliced portion of the rubber protruding portion (14) between the rubber layers (12, 13) is likely to be opened when the laminate (15) is fitted onto the tire making drum. If the amount of protrusion (h) is more than 20 mm, a wrinkle is likely to be generated when the rubber protruding portion (14) is pressed down by the pressure roller (24), and also the uniformity of the tire is deteriorated because of the rubber protruding portion (14) having such a large size.

The size of the pressure roller (24) or the pressure pin is not particularly limited. The radius (r) is preferably not less than 1 mm and also not more than 7.5 times the amount of protrusion (h) of the rubber protruding portion (14), and more preferably, not more than 3.4 times the amount of protrusion (h). If the radius (r) is smaller than the amount of protrusion (h), the pressure roller (24) or the pressure pin first presses a side surface of the rubber protruding portion (14). In this case, the rubber protruding portion (14) is rightly pressed down in the circumferential direction of the making drum (23). However, the lower limit of the radius (r) is preferably set at 1 mm from the viewpoint of the workability and the stiffness of the pressure roller (24) or the pressure pin. On the other hand, if the radius (r) is larger than the amount of protrusion (h), the pressure roller (24) or the pressure pin first presses a tip of the rubber protruding portion (14). In this case, if the radius (r) is increased, the force to press the rubber protruding portion (14) in the circumferential direction of the making drum (23) is reduced, while the force to press the rubber protruding portion (14) in the radial direction of the making drum (23) becomes more likely to act. For these reasons, the radius (r) of the pressure roller (24) is preferably set at not more than 7.5 times the amount of protrusion (h), and more preferably, not more than 3.4 times the amount of protrusion (h), so that the rubber protruding portion (14) can be rightly pressed down in the circumferential direction of the making drum (23). As a result, air can be prevented from getting inside in the pressing process.

In the present invention, as the thickness of the film (11), any of those used for the publicly-known tires may be employed. Although not particularly limited, the thickness may be selected from a range from 0.002 mm to 0.7 mm. On the other hand, although not particularly limited, the thickness of each of the rubber layers (12, 13) may be selected from a range from 0.1 mm to 3.0 mm.

As the thermoplastic resin or the thermoplastic elastomer composition in which an elastomer component is blended with a thermoplastic resin component, for forming the film (11), any of those publicly available may be used.

Examples of the thermoplastic resin and the thermoplastic resin component for the thermoplastic elastomer composition include polyamide-based resins, polyester-based resins, polynitrile-based resins, polyvinyl-based resins, cellulose-based resins, fluorine-based resins, and imide-based resins. Examples of the elastomer component for the thermoplastic elastomer composition include diene-based rubbers, hydrogenated diene-based rubbers, olefin-based rubbers, isobutylene-isoprene rubbers (IIR), copolymers of isobutylene and aromatic vinyl or diene-based monomers, acrylic rubber (ACM), ionomers, halogen-containing rubbers, silicone rubbers, sulfur-containing rubbers, fluororubbers, and thermoplastic elastomers.

The composition ratio of the thermoplastic resin component and the elastomer component in the thermoplastic elastomer composition may be determined as appropriate in consideration of the balance between the flexibility and the thickness of the film. The composition ratio is preferably in a range from 10/90 to 90/10, and more preferably, in a range from 20/80 to 85/15 (in weight ratio).

Another polymer such as a compatibilizer, or a compounding agent may be mixed, as a third component, with the thermoplastic elastomer composition, in addition to the thermoplastic resin component and the elastomer component. Another polymer may be mixed for the purpose of, for example, improving the compatibility of the thermoplastic resin component and the elastomer component, improving the processability and formability of the material into a film, improving the heat resistance of the film, and reducing the manufacturing costs. Examples of materials used for such purposes include polyethylene, polypropylene, polystyrene, acrylonitrile-butadiene-styrene resin (ABS), styrene-butadiene-styrene copolymer (SBS), and polycarbonate.

Although the thermoplastic resin or the thermoplastic elastomer composition may be solely laminated with the rubber layers, an adhesive layer may be interposed therebetween in order to improve its adhesion with the rubber layer. The thickness of the adhesive layer is not particularly limited, but should be as small as possible in terms of reduction in weight of the tire, and therefore, preferably is 5 μm to 150 μm.

The present invention will be further described hereinbelow with reference to examples, but the present invention is not limited to these examples.

EXAMPLES

A cylindrical film (with a circumferential length of 1200 mm and a thickness of 100 μm) having a two-layer structure of a thermoplastic elastomer composition and an adhesive agent was formed by inflation molding. Before being wound up, the cylindrical film was passed between pinch rolls, thus being formed into a sheet. Then, a rubber layer with a width of 660 mm and a thickness of 0.5 mm was stacked on each of the two sides of the film by using a calendar machine, so that a laminate was formed. In this event, the edge portions, in the width direction, of each of the rubber layers were caused to protrude respectively from the edge portions of the film, and the edge portions, on each side, of the respective rubber films are pressure-bonded to each other. Thereafter, five different types of laminates were prepared by cutting the protruding parts of the rubber layers in a manner that the amounts of protrusion from each of the edge portions of the film became 2 mm, 3 mm, 10 mm, 20 mm, and 25 mm, respectively.

Each of the five different types of laminates was cut to have a length of 390 mm in the axial direction. Then, pneumatic tires with a tire size of 195/65R15, each having one of these laminates as an air permeation preventive layer, were manufactured in the following manner. In the course of manufacturing the pneumatic tires, uncured tires were formed by fitting the laminates onto the tire making drum under conditions that are, as shown in Table 1, different from each other in the amount of protrusion of the rubber protruding portion and in whether or not the rubber protruding portion was pressed down toward the surface of the making drum by use of the pressure roller. Then, six different types of pneumatic tires (Examples 1 to 3 and Comparative Examples 1 to 3) were manufactured by curing these uncured tires. Note that, in manufacturing each pneumatic tire, the pressure roller having a radius of 10 mm was used.

The state of the surface of the cavity of each of the six pneumatic tires thus manufactured was visually evaluated. Specifically, each of the six pneumatic tires was evaluated as to whether or not a curing failure occurred in the air permeation preventive layer in accordance with the following criteria. GOOD: No curing failure such as blister liner was observed. BAD: Curing failure such as blister liner occurred at many portions.

TABLE 1

| | Example 1 | Example 2 | Example 3 | Comparative Example 1 | Comparative Example 2 | Comparative Example 3 |
|---|---|---|---|---|---|---|
| Amount of Protrusion h [mm] of Rubber Protruding Portion | 3 | 10 | 20 | 10 | 2 | 25 |
| Whether or not to Press down Rubber Protruding Portion by use of Pressure Roller (YES or NO) | YES | YES | YES | NO | YES | YES |
| Curing Failure in Air Permeation Preventive Layer | GOOD | GOOD | GOOD | BAD | BAD | BAD |

What is claimed is:

1. A method for manufacturing a pneumatic tire, comprising the steps of:

forming a cylindrical film of any one of a thermoplastic resin and a thermoplastic elastomer composition in which an elastomer is blended with a thermoplastic resin;

folding the cylindrical film into a sheet shape;

forming a laminate by stacking rubber layers respectively on both surfaces of the folded film;

expanding the laminate into a cylindrical shape and fitting the expanded laminate onto a tire making drum;

pasting other components of a tire, including a carcass layer, onto an outer side of the laminate, so as to form an uncured tire having the film as an air permeation preventive layer; and curing the uncured tire, wherein in the step of forming a laminate, the rubber layers are stacked respectively on both surfaces of the film folded into the sheet shape in a manner that each rubber layer protrudes from both edge portions of the film in a width direction, and the laminate is then formed by cutting protruding parts of the rubber layers respectively into rubber protruding portions each having an amount of protrusion (h) in a range from 3 mm to 20 mm, from the edge portion of the film in the width direction; and after the laminate is expanded into the cylindrical shape and fitted onto the tire making drum, each of the rubber protruding portions is pressed down toward the surface of the tire making drum by use of any one of a pressure roller and a pressure pin, so as to be pressure-bonded to the rubber layer of the laminate.

2. The method for manufacturing a pneumatic tire according to claim 1, wherein a radius (r) of the one of the pressure roller and the pressure pin is not less than 1 mm and not more than 7.5 times the amount of protrusion (h) of the rubber protruding portions.

* * * * *